United States Patent Office 3,120,378
Patented Feb. 4, 1964

3,120,378
BLEACHING, STERILIZING AND DISINFECTING
TABLET AND METHOD OF PREPARATION
William W. Lee and Kenneth M. Sancier, Palo Alto,
Calif., assignors to The Procter & Gamble Company,
Cincinnati, Ohio, a corporation of Ohio
No Drawing. Filed Feb. 29, 1960, Ser. No. 11,451
2 Claims. (Cl. 252—95)

This invention relates to a novel bleaching, disinfecting and sterilizing tablet, and more particularly to a tablet of this character which incorporates dischlorocyanurate and carbonate components and which may quickly be dissolved in water with effervescent evolution of carbon dioxide and the provision of available chlorine.

Bleaching, disinfecting and sterilizing compositions containing available chlorine are on the market in the form of liquids and solid powders. If compositions having similar properties could be prepared in the form of stable, readily dissolved tablets, such tablets would offer many advantages to the average user. For example, bleaching tablets each containing a predetermined amount of available chlorine could be dropped in the wash without the necessity of measuring or guessing the proper amount of liquid or powder bleach.

It is an object of this invention to provide such a bleaching, disinfecting and sterilizing tablet which has a high degree of physical strength, excellent stability during storage, and rapid solution in water.

In accordance with the present invention a tablet having the foregoing desirable properties is obtained by molding under pressure in the presence of sufficient water to bind the components together a water soluble composition comprising an alkali metal carbonate, a hydrate forming compound, a dichlorocyanurate, and a solid acid. Water used for binding the components of the tablet combines with the hydrate forming compound to form a solid hydrate so that there is no free water in the resultant compressed tablet. The tablet may be quickly dissolved in excess water with accompanying effervescence as the acidic component reacts with the carbonate to liberate carbon dioxide, while the dissolved dichlorocyanurate releases available chlorine to the solution to effect the desired bleaching, disinfecting and germicidal action. Rapid solution of the tablet is caused by the effervescent release of carbon dioxide as a result of the reaction of solid acid and the alkali metal carbonate.

The term alkali metal carbonate is employed herein to designate the various normal and acid salts of alkali metals with carbonic acid. Hydrate forming compound refers to a compound capable of forming a hydrate with the water employed for binding the components of the tablet together.

Most advantageously the solid acid is dichlorocyanuric acid since this one compound provides the acid for liberation of the carbon dioxide and also is the dichlorocyanurate which provides the available chlorine. In addition, the water employed during molding to provide a mechanically strong tablet is most advantageously provided from water contained within a hydrate compound. It is believed that during the molding step the increase in the temperature and pressure combine to make the water maintained in the solid hydrate available to bind the components together. The molding pressure alone causes a substantial temperature rise. As soon as the molding pressure is reduced and the temperature drops, free water immediately recombines with the hydrate forming compound to form the hydrate, and the combined water is not available to cause premature reaction of acid and carbonate or evolution of chlorine from the dichlorocyanurate. Less desirably a small amount of free water can be incorporated in the mixture during molding, and the water will quickly combine with the hydrate forming compound to form a hydrate. However, this method results in some undesired effervescence and loss of available chlorine from the mixture, and thus is not as desirable as when the water is initially provided by temporary release from a hydrate.

In greater detail, the alkali metal carbonates employed in the tablet are the normal and acid salts of alkali metals with carbonic acid. Examples of such carbonates are $Na_2CO_3$, $Na_2CO_3 \cdot H_2O$, $Na_2CO_3 \cdot 10H_2O$, $NaHCO_3$,
$NaHCO_3 \cdot Na_2CO_3 \cdot 2H_2O$, $K_2CO_3$, $K_2CO_3 \cdot 2H_2O$,
$K_2CO_3 \cdot 3H_2O$, $KHCO_3$, $NaKCO_3$, $Li_2CO_3$, $Cs_2CO_3$
and
$Rb_2CO_3$ These salts react with the acid to provide the source of carbon dioxide which causes effervescence and rapid solution of the tablet when it is placed in water. Of these salts, those of sodium and potassium are preferred, inasmuch as they combine the elements of good solubility and low cost.

The hydrate forming compound in the bleaching tablet is most advantageously an alkali metal hydrate-forming salt. During formation of the tablet by compression of the composition while it is in contact with a small amount of binding water, the hydrate forming compound must be capable of accepting additional water in the hydrate structure. In other words during this brief period of compression the hydrate forming compound should either be in the anhydrous form or in a lower hydrate form which is capable of accepting additional water of crystallization and becoming a higher hydrate. After compression the hydrate forming compound accepts and holds free water in the solid hydrate structure, and thus prevents premature effervescence or liberation of chlorine. Examples of alkali metal hydrate forming salts which may be employed as the hydrate forming compound are as follows:

$Na_2CO_3$ to $Na_2CO_3 \cdot H_2O$ or $Na_2CO_3 \cdot 10H_2O$
$Na_2SO_4$ to $Na_2SO_4 \cdot 10H_2O$
$Na_2B_4O_7$ to $Na_2B_4O_7 \cdot 10H_2O$
$Na_2HPO_4$ to $Na_2HPO_4 \cdot 7H_2O$ or $Na_2HPO_4 \cdot 12H_2O$
$Na_4P_2O_7$ to $Na_4P_2O_7 \cdot 10H_2O$
$Na_2C_4H_4O_6$ to $Na_2C_4H_4O_6 \cdot 2H_2O$
$K_2CO_3$ to $K_2CO_3 \cdot 2H_2O$
$NaH(SO_4)$ to $NaH(SO_4) \cdot H_2O$
$Na_2H_2P_2O_7$ to $Na_2H_2P_2O_7 \cdot 6H_2O$
$Na_5P_3O_{10}$ to $Na_5P_3O_{10} \cdot 6H_2O$ When anhydrous sodium carbonate, sodium carbonate monohydrate, or another alkali metal carbonate which is a hydrate forming compound is employed in the composition, the alkali metal carbonate serves the dual function of providing a source of carbon dioxide gas which causes the effervescence and also of serving as the hydrate forming compound. In such cases it is not necessary to employ other hydrate forming compounds in the tablet, although they may also be included in the composition as fillers and as additional means of holding any excess water used for binding the tablet. However, the carbonate need not be a hydrate forming compound, since one of the other hydrate forming compounds may be employed in the composition. Also, the $NaH(SO_4) \cdot H_2O$ may be used to serve the dual purpose of providing the hydrate forming compound and the acid which liberates carbon dioxide from the carbonate.

As previously described, the most efficient and advantageous method of providing the water which forms a mechanically strong tablet is to employ water contained in the solid crystalline srtucture within a hydrate compound. When this procedure is followed a hydrate is initially included within the tablet composition, it releases water for binding the tablet as the pressure and temperature exceed the hydrate transition point during molding, and free water is promptly taken back into the hydrate structure when the pressure and temperature are reduced below the hydrate transition point. The water released from the hydrate during molding is only briefly present as free water, and thus premature effervescene or release of chlorine due to the presence of the binding water is minimized.

When the water from a hydrate is used to bind the composition during molding, it is advantageous to employ a hydrate that has a transition temperature above about 25° C. and below about 150° C. so that the pressure and resultant temperature rise during molding will cause temporary release of the water of hydration. However, hydrates which have high transition temperatures and which do not release water of crystallization because of the molding pressure and resultant temperature rise may also be utilized to provide the binding water by heating the hydrate to above its transition temperature during molding of the tablet.

Sodium sulfate decahydrate is a particularly desirable source of the binding water since it is inexpensive, readily available, and it has a transition temperature of about 32° C. The usual molding pressures and temperatures readily cause sodium sulfate decahydrate to release its water of crystallization briefly to bind the tablet together. However, any of the other hydrates previously listed may advantageously be included in the composition to provide release of binding water because of the pressure and temperature rise during molding.

The dichlorocyanurate in the tablet provides the source of available chlorine when the tablet is dissolved in water. The tablet also includes a solid acid which is capable of reacting with the carbonate component of the tablet to liberate carbon dioxide. When, as is preferably the case, the dichlorocyanurate is dichlorocyanuric acid, this one compound serves both as the source of available chlorine and as the source of the solid acid. However, the dichlorocyanurate may also take the form of an alkali metal salt of dichlorocyanuric acid, in which case another water-soluble solid acid or acid salt strong enough and in an amount sufficient to liberate carbon dioxide from the carbonate component is incorporated in the mixture. Examples of solid acidic compounds including acids and acid salts which may be employed in the tablet composition include citric acid, alkali metal acid citrates, tartaric acid, alkali metal acid sulfates, lactic acid, malic acid, maleic acid, alkali metal acid phosphates, alkali metal acid phthalates and p-toluenesulfonic acid.

The term dichlorocyanurate, it will be noted, is employed herein to include both dichlorocyanuric acid and its alkali metal salts since all these compounds incorporate the dichlorocyanurate anion which in aqueous solution provides the available chlorine that gives the compounds its bleaching, disinfecting and sterilizing properties. The dichlorocyanurates are employed in the bleaching tablet rather than the well known trichlorocyanurates because of the greater stability and other advantageous properties of the dichloro compound.

Dichlorocyanurate compounds employed herein may be represented by the empirical formula $(C_3N_3O_3Cl_2)M$ in which $(C_3N_3O_3Cl_2)$ represents the dichlorocyanurate and M is hydrogen or any alkali metal. When M is hydrogen the compound is dichlorocyanuric acid. Salts of dichlorocyanuric acid are formed when an alkali metal cation replaces the acid hydrogen atom. In the event a salt is used instead of dichlorocyanuric acids, the sodium and potassium alkali metal dichlorocyanurates are preferable to the other alkali metals since they are readily dissolved in water, and they are easy to remove from clothes by rinsing.

In general, there are two readily available methods for preparing dichlorocyanuric acid. In one, cyanuric acid, an available article of commerce, is reacted with the well known trichlorocyanuric acid. In the other method, elemental chlorine is added to a solution of cyanuric acid in either the presence or the absence of added alkali metal hydroxide. These methods are described in greater detail in U.S. Patents No. 2,913,460.

The methods of preparation described in the aforementioned patent lend themselves to the production of either dichlorocyanuric acid or of an alkali metal salt of said acid. Also, the alkali metal salts of dichlorocyanuric acid are readily prepared by placing the acid in a solution of the hydroxide of any alkali metal. At least stoichiometric amounts of the hydroxide are required to form the corresponding salt. For example, a solution containing one mol of sodium hydroxide and one mol of dichlorocyanuric acid forms the sodium salt. The salts are readily obtained from their solutions by evaporating the excess water in any well known manner or by conventional spray drying techniques.

Other fillers, such as the neutral salt $NaNO_3$, may be included in the composition. However, they only tend to reduce the mechanical strength of the tablet, and increase the time required to dissolve the tablet.

Various minor ingredients can be added to the composition of this invention but are not necessary. Examples of such minor ingredients are: anionic organic detergents such as sodium tallow alkyl sulfate or sodium coconut soap; dye lubricants such as magnesium stearate; inert fillers such as starch; perfume; optical brighteners; dyes; sodium carboxymethyl cellulose. The tablet can also be coated with a water soluble film, such as a polyvinyl alcohol film, if desired.

In determining the overall amounts and proportions of the ingredients of the composition to be pelleted, attention may first be given to the weight of dichlorocyanurate to be incorporated in a given tablet. In this respect, it should be noted that dichlorocyanuric acid contains approximately 36 percent by weight chlorine and, in accordance with conventional usage, twice that amount, or 72 percent by weight of available chlorine. A concentration of 100 p.p.m. available chlorine is regarded as optimum for bleach purposes when laundering clothes, which amount is provided as 5 grams of dichlorocyanuric acid are dissolved in 8 gallons of water. Stain removal concentration of 1600 p.p.m. available chlorine is provided by dissolving this amount in 2 quarts of water. When an alkali metal salt of dichlorocyanuric acid is employed, the proportion of available chlorine in the compound is correspondingly reduced for any given weight of dichlorocyanurate since the alkali metals are heavier than hydrogen. With the above facts in mind, a determination may properly be made concerning the weight of the dichlorocyanurate to be incorporated in each tablet, although it is not essential that each tablet contain any specific amount of dichlorocyanurate since any number of tablets may be used to provide the desired concentration of chlorine.

In proportioning the ingredients of the composition, best results are obtained by employing stoichiometric amounts of the solid acid and the carbonate for securing rapid solution of the pellet. The term "equivalent" is here used in the acid-base sense, with one gram molecular weight of solid acid being regarded as the equivalent of one gram molecular weight of $NaHCO_3$ for example, or of 0.5 gram molecular weight of $Na_2CO_3$. However, lesser amounts may be employed and the amounts are not critical. It is only necessary that there be above about 0.05 equivalent of acid for each equivalent of bicarbonate formed upon solution of said tablet. In other words when the alkali metal carbonate is a bicarbonate, any amount of acid in excess of 0.05 equivalent per equivalent of the bicarbonate is sufficient to cause some effervescence and solution of the tablet. However, when the carbonate rather than the bicarbonate is used in the tablet 0.5 equivalent of acid is required to change the carbonate to bicarbonate which reaction does not in itself cause effervescence. Thus at least an additional 0.05 equivalent of acid is required making a total of 0.55 equivalent per equivalent of carbonate to liberate carbon dioxide and cause effervescence. Except for the preceding considerations, the proportions of the various ingredients in the tablet are not very critical and may vary over relatively wide limits. The following proportions in percent by weight may be present in the tablet on the basis of a dried tablet and based on the total weight of such components in said tablet:

| | |
|---|---|
| Alkali metal carbonate | 5–95 |
| Alkali metal hydrate forming salt | 5–95 |
| Dichlorocyanurate | 5–95 |
| Solid acid | 5–95 |

As previously explained, the hydrate forming compound may be the same compound as the alkali metal carbonate, and the solid acid may be dichlorocyanuric acid. This explains the upper limit of 95 percent even though there are four components in the tablet each of which should constitute at least five percent by weight of the tablet. For example the carbonate and hydrate may be $$Na_2CO_3 \cdot H_2O$$

present in the amount of 5 percent by weight, and the solid acid and dichlorocyanurate may be present in the amount of 95 percent by weight on the dry basis of the carbonate hydrate forming salt, solid acid and dichlorocyanurate present in the tablet. If the four components of the tablet are present in three compounds, the maximum amount of any compound present is 90 percent.

The foregoing proportions do not include the water which is employed in the tablet composition in an amount sufficient to bind the components firmly together during the pelleting step. The water is preferably removed from the final tablet as hereinafter described, but is employed during molding to insure adequate mechanical strength in the finished tablet. The minimum amount of water required for this purpose has been found to be approximately 2 percent by weight of the composition if a strong, durable tablet is to be obtained. As much as 15 percent by weight water may be employed. The use of water in amounts larger than 15 percent is preferably avoided to reduce the costs of drying the pelleted tablets, and also to avoid undue liberation of chlorine and premature effervescence during formation of the tablet.

As previously described, the water necessary to a proper binding together, or cementing of the components of the mixture can be supplied in any convenient form. Thus, the composition may be exposed to a moist atmosphere, or water can be added directly to the mixture. However, the first of these methods had the disadvantage of making it difficult to control the water content of the mixture, while the second tends to induce decomposition of the carbonate compound, particularly when the same takes the form of a bicarbonate salt. It has been found that these and other difficulties are overcome by adding at least the major portion of the required water in the form of a hydrate of one or more of the ingredients of the mixture to be pelleted. The water of hydration so added may be released in the vapor or liquid form at the pressures and temperatures generated in the tablet during the step of pelleting the composition, the pressures normally ranging from about 1500 to 5000 p.s.i., as hereinafter described. Thus, in a tablet composition containing 5 grams of dichlorocyanuric acid and an equivalent amount of sodium bicarbonate (2.1 grams), excellent results are obtained by using 0.35 gram of $Na_2SO_4 \cdot 10H_2O$, which provides approximately 2.5 percent by weight of water in the composition. Similarly, in a composition containing equivalent amounts of dichlorocyanuric acid (5 g.) and sodium carbonate monohydrate (1.55 g.), the hydrate content of the carbonate is such as to provide the mixture with approximately 3.5 percent water, and this proportioning of the ingredients also results in a tablet having a high degree of resistance to fracture and abrasion.

Having selected the components to be employed in the tablets, the latter are formed by first thoroughly mixing the ingredients, which are preferably present in the powdered or other finely divided form at this stage of the operation, and then pelleting the mixture by subjecting the same to elevated pressures in a suitable mold. The molding pressures required to produce tablets of good tensile strength vary with the particular composition employed. Thus, using a mixture of 5 grams of dichlorocyanuric acid 2.1 grams of sodium bicarbonate and 0.35 gram of sodium sulfate decahydrate, and a die having a diameter of 1.25 inches, it was found that a pressure of at least 1500 p.s.i. was required to form tablets having adequate mechanical strength. Pressures above about 3500 p.s.i. are preferably avoided in tableting this composition inasmuch as the tablets so formed dissolve at an appreciably slower rate than those formed in the preferred 1500–3500 p.s.i. range.

On the other hand, when tableting a mixture made up of 5 grams of dichlorocyanuric acid and 1.55 grams of sodium carbonate monohydrate, a pressure of at least 3000 p.s.i. is required to provide adequate tablet strength, and preferably pressures of from 3000 to 4000 p.s.i. are employed.

It is not necessary to dry the tablets of this invention following the pelleting step. However, drying the tablets has the desirable effect of making the tablet structure somewhat porous and of increasing the rate at which the tablets dissolve in water. Thus, while tablets of the type illustrated above, and containing 5 grams of dichlorocyanuric acid dissolve in approximately 50 seconds at 50° C. if not dried, this period is cut approximately in half as the tablets are dried for 45 minutes at 100° C., 20 minutes at 150° C. or 10 minutes at 175° C. Any temperature between about 25° C. and 200° C. may be used for drying the tablet. Excessively high temperatures, e.g., 200° C., or overly long periods of heating decrease the rate of solution. Losses of chlorine are negligible at temperatures below 175° C., as are those of carbon dioxide. From a practical standpoint, the use of drying periods of from 5 to 20 minutes at temperatures between 125 to 175° C. are preferred.

It is believed that the present invention is illustrated in various of its embodiments by the following examples.

EXAMPLE I

In this operation, tablets were formed from a powdered mixture of dichlorocyanuric acid (DCA), sodium bicarbonate and sodium sulfate decahydrate, each tablet having the following composition:

| | Grams |
|---|---|
| Dichlorocyanuric acid | 5 |
| $NaHCO_3$ | 2.1 |
| $Na_2SO_4 \cdot 10H_2O$ | 0.35 |

The tablets were formed at various pressures in a pelleting machine having a die diameter of 1.25 inches. All of the tablets so formed were then dried for 5 minutes at 175° C. Tests were then made to determine the length of time required to fully dissolve the tablet in 4 liters of water at 50° C. It was found that this time became increasingly long as higher molding pressures were employed, the data so obtained being given in the following table:

Table 1

| Degree of compression (pounds per square inch): | Time for solution (seconds) |
|---|---|
| 1000 [1] | 12 |
| 1500 | 13 |
| 2000 | 14 |
| 2500 | 15 |
| 3000 | 16 |
| 5000 | 24 |
| 8000 | 32 |

[1] This tablet had inadequate mechanical strength.

A series of tests were then made with tablets formed as described above at 2000 p.s.i., but with the practice of a variety of drying methods, said drying being effected by placing the tablets in an oven through which air at the indicated temperatures is forced. The time required to dissolve the tablets in 3 liters of water at 50° C. was then measured, the data so obtained being given below in Table 2.

*Table 2*

| Drying Conditions | | | Percentage Loss of Original Available Chlorine During Drying |
|---|---|---|---|
| Temp. (° C.) | Time (Min.) | Solution Time (Sec.) | |
| 50 | 20 | 43 | nil |
| 50 | 30 | 32 | nil |
| 50 | 45 | 23 | 0.4 |
| 100 | 10 | 30 | 0.4 |
| 100 | 20 | 28 | 0.2 |
| 100 | 30 | 22 | 0.8 |
| 100 | 45 | 15 | 0.8 |
| 150 | 5 | 27 | 0.4 |
| 150 | 10 | 25 | nil |
| 150 | 20 | 11 | 0.6 |
| 150 | 30 | 14 | 0.9 |
| 175 | 5 | 18–33 | 3.0 |
| 175 | 10 | 14–33 | 3.4 |
| 175 | 20 | 13–38 | 4.1 |
| 175 | 30 | 22–40 | 4.9 |
| 200 | 1 | 20–38 | nil |
| 200 | 3 | 22–45 | nil |
| 200 | 5 | 11–56 | 0–3.5 |
| 200 | 10 | 31 | 6.2 |

EXAMPLE II

In this example, tablets having good mechanical strength were pelleted at 3000 p.s.i. (die diameter of 1 5/16 inches), each tablet having the following composition:

| | Grams |
|---|---|
| Dichlorocyanuric acid | 5 |
| $Na_2CO_3 \cdot H_2O$ | 1.55 |

The tablets prepared in this manner were dried at 150° C. from 10–15 minutes, and were then found to dissolve in 3 liters of water at 50° C. in 14 seconds.

EXAMPLE III

It is found that tablets having excellent bleaching characteristics, together with rapid solubility and good mechanical strength, can be formed at pressures of 2500 p.s.i. using the following formulation with the amount in each tablet being specified.

| | Grams |
|---|---|
| Potassium dichlorocyanurate | 4.8 |
| $Na_2CO_3 \cdot H_2O$ | 2.5 |
| $NaHSO_4$ | 1.7 |

EXAMPLE IV

To evaluate the possible loss in fabric tensile strength occasioned by the tablets of this invention as they come into contact with the fabric in the presence of but small amounts of water, the following test was made. A tablet containing 5 grams of dichlorocyanuric acid and 2.1 grams of sodium sulfate decahydrate was placed on dry percale (10 pieces, each 4" x 10"), and 250 ml. of water at 125° F. was slowly added with stirring. The resulting system was then allowed to stand for 5 minutes, after which the bleaching solution was rinsed from the fabric. The tensile strength of the percale pieces was then measured, and it was found that they had suffered little if any loss in strength.

In the case of the tablets described in the preceding paragraph as well as with others of the tablets described above, it was also determined that the dissolved dichlorocyanurate compound provided an extremely effective bleaching action.

What is claimed is:

1. A water soluble bleaching, sterilizing and disinfecting tablet comprising sodium sulfate, a solid alkali metal bicarbonate, and dichlorocyanuric acid, said sodium sulfate, bicarbonate, and dichlorocyanuric acid each being present in an amount of at least 5 percent by weight on the dry basis of the components in said tablet, and there being above about 0.05 equivalent of acid for each equivalent of said bicarbonate; said tablet being characterized by a structure formed by compression of the composition while it is in contact with a small amount, from about 2% to about 15% of binding water and said tablet in finished form being substantially free of water and being relatively porous compared to a tablet formed directly from the same water free components.

2. The method of preparing a water soluble bleaching, sterilizing and disinfecting tablet which comprises forming a powdery mixture by intermixing solid sodium sulfate decahydrate, an alkali metal bicarbonate, and dichlorocyanuric acid, said sodium sulfate, bicarbonate, and dichlorocyanuric acid each being present in an amount of at least 5 percent by weight of said tablet; molding said mixture under sufficient pressure to elevate the temperature of said mixture above the transition temperature of said sodium sulfate decahydrate to release the water from the solid hydrate structure; forming said tablet by releasing the pressure and lowering the temperature of said mixture below the transition temperature of said hydrate so the free water is again taken into the solid hydrate structure of said sodium sulfate decahydrate; and drying said tablet at a temperature above about 25° C. and below about 200° C.

References Cited in the file of this patent

UNITED STATES PATENTS

| 2,387,244 | Compton et al. | Oct. 23, 1945 |
| 2,931,776 | Howard | Apr. 5, 1960 |

FOREIGN PATENTS

| 551,308 | Belgium | Mar. 26, 1937 |
| 1,019,426 | Germany | Nov. 14, 1957 |
| 741,637 | Great Britain | Dec. 7, 1955 |
| 219,930 | Australia | Jan. 22, 1959 |